US011310594B2

(12) United States Patent
Fraize, Jr. et al.

(10) Patent No.: US 11,310,594 B2
(45) Date of Patent: Apr. 19, 2022

(54) PORTABLE SMART SPEAKER POWER CONTROL

(71) Applicant: Bose Corporation, Framingham, MA (US)

(72) Inventors: John Edward Fraize, Jr., Northborough, MA (US); Dylan Maxwell Reilly, Ashland, MA (US); Jonathan Hilton Cooper, Newport, RI (US); Karthik Ramana Sankar, Shrewsbury, MA (US); Hector Andres Saint-Hilaire, Waltham, MA (US); Kenneth Andrew Taylor, Pepperell, MA (US); David Gerard Burkhardt, Milford, MA (US); Ajay Shrikar Khambadkone, Westborough, MA (US); Wen Shi, Wellesley Hills, MA (US); Isabel Anna Dunning, Arlington, MA (US); Paul William Larsen, Watertown, MA (US)

(73) Assignee: Bose Corporation, Framingham, MA (US)

( * ) Notice: Subject to any disclaimer, the term of this patent is extended or adjusted under 35 U.S.C. 154(b) by 15 days.

(21) Appl. No.: 16/574,273

(22) Filed: Sep. 18, 2019

(65) Prior Publication Data
US 2021/0084406 A1 Mar. 18, 2021

(51) Int. Cl.
*H04R 3/00* (2006.01)
*G06F 3/16* (2006.01)
(Continued)

(52) U.S. Cl.
CPC .............. *H04R 3/00* (2013.01); *G06F 1/3287* (2013.01); *G06F 3/162* (2013.01); *H04R 1/08* (2013.01);
(Continued)

(58) Field of Classification Search
CPC ........ H04R 3/00; H04R 1/08; H04R 2420/07; G06F 1/3287; G06F 3/162; G10L 15/22; G10L 2015/223
(Continued)

(56) References Cited

U.S. PATENT DOCUMENTS 9,319,782 B1* 4/2016 Crump ............... H04R 3/02
2009/0268936 A1* 10/2009 Goldberg ............ H04R 1/1041
381/384
(Continued)

FOREIGN PATENT DOCUMENTS

WO 2018075417 A1 4/2018

OTHER PUBLICATIONS

PCT International Search Report and Written Opinion for International Application No. PCT/US2020/051542, dated Dec. 17, 2020, 10 pages.

*Primary Examiner* — Paul Kim
*Assistant Examiner* — Douglas J Suthers
(74) *Attorney, Agent, or Firm* — Hoffman Warnick LLC (57) ABSTRACT

Various aspects include a speaker including: an acoustic transducer for providing an audio output; a set of microphones for detecting a user voice command; and a controller coupled with the acoustic transducer and the set of microphones, wherein the controller is configured to: in response to detecting a power down command, switch the set of microphones from an active listening mode to a standby mode for a parking period, in response to detecting a power up command during the parking period, switch the set of microphones from the standby mode to the active listening mode after a first time period, and in response to detecting the power up command after expiration of the parking period switch the set of microphones from the standby mode
(Continued)

to the active listening mode after a second time period that is greater than the first time period.

20 Claims, 4 Drawing Sheets

(51) Int. Cl.
  *H04R 1/08* (2006.01)
  *G06F 1/3287* (2019.01)
  *G10L 15/22* (2006.01)

(52) U.S. Cl.
  CPC ........ *G10L 15/22* (2013.01); *G10L 2015/223* (2013.01); *H04R 2420/07* (2013.01)

(58) Field of Classification Search
  USPC ........................................................ 381/110
  See application file for complete search history.

(56) References Cited

U.S. PATENT DOCUMENTS

| | | | | |
|---|---|---|---|---|
| 2015/0203126 | A1* | 7/2015 | Kobana | B60K 28/06 701/93 |
| 2016/0381316 | A1* | 12/2016 | Gilson | H04N 21/812 340/12.54 |
| 2017/0102700 | A1* | 4/2017 | Kozak | G05D 1/0061 |
| 2019/0260413 | A1* | 8/2019 | Medapalli | G06F 1/3206 |
| 2019/0394547 | A1* | 12/2019 | Lemons | G10L 15/28 |
| 2020/0142400 | A1* | 5/2020 | Kuwabara | B62D 15/027 |

* cited by examiner

PORTABLE SMART SPEAKER POWER CONTROL

TECHNICAL FIELD

This disclosure generally relates to power management in speaker systems and related devices. More particularly, the disclosure relates to systems and approaches for managing power usage in a portable smart speaker.

BACKGROUND

The proliferation of speaker systems and audio devices in the home and other environments has enabled dynamic user experiences. In particular, smart speakers such as those enabling virtual personal assistants (VPAs) have proliferated in part due to advances in voice interface technology and connection speeds. VPAs can provide a dynamic, hands-free experience for users. However, the devices running these VPAs draw a significant amount of power to enable functions such as voice recognition, searching and audio playback. Conventional smart speakers are either directly connected with a power source (e.g., a power outlet) at all times, or have limited battery life for operating away from a direct power source (e.g., on the go). These conventional smart speakers can hinder the user experience.

SUMMARY

All examples and features mentioned below can be combined in any technically possible way.

Various aspects include systems and approaches for managing power usage in smart speakers. In certain aspects, a speaker includes a controller for managing power usage in different operating states or modes. In certain other aspects, a computer-implemented method enables power management in a speaker.

In some particular aspects, a speaker includes: an acoustic transducer for providing an audio output; a set of microphones for detecting a user voice command; and a controller coupled with the acoustic transducer and the set of microphones, wherein the controller is configured to: in response to detecting a power down command, switch the set of microphones from an active listening mode to a standby mode for a parking period, in response to detecting a power up command during the parking period, switch the set of microphones from the standby mode to the active listening mode after a first time period, and in response to detecting the power up command after expiration of the parking period, switch the set of microphones from the standby mode to the active listening mode after a second time period that is greater than the first time period.

In some particular aspects, a computer-implemented method of controlling a speaker is disclosed. The speaker system includes an acoustic transducer for providing an audio output and a set of microphones for detecting a user voice command. In these aspects, the method includes: in response to detecting a power down command for the speaker, switching the set of microphones from an active listening mode to a standby mode for a parking period, in response to detecting a power up command during the parking period, switching the set of microphones from the standby mode to the active listening mode after a first time period, and in response to detecting the power up command after expiration of the parking period, switch the set of microphones from the standby mode to the active listening mode after a second time period that is greater than the first time period.

Implementations may include one of the following features, or any combination thereof.

In certain cases, the controller is configured to maintain the set of microphones in the active listening mode while the speaker is connected to an external power source.

In particular aspects, while the speaker is disconnected from the external power source, the controller is further configured, after expiration of an additional period without detecting the power up command after expiration of the parking period, to switch the speaker from the first sleep mode to a second sleep mode requiring less power than the first sleep mode.

In some implementations, while in the second sleep mode, the speaker requires a delay of a third time period to switch the set of microphones to the active listening mode, where the third time period is greater than the second time period.

In certain aspects, the parking period is at most approximately 5 minutes to approximately 10 minutes, the additional period is at most approximately 12 to approximately 24 hours, the second time period is at most approximately 5 seconds to approximately 15 seconds, and the third time period is at least approximately 15 seconds.

In some cases, the set of microphones include far field microphones, and in the active listening mode, the set of microphones are configured to detect a wake up word (WUW) for triggering input of the user voice command to a virtual personal assistant (VPA).

In particular implementations, the speaker further includes: a power storage device; and a communications module configured to communicate over both a local area wireless network communication protocol and at least one additional communication protocol.

In some cases, the additional communication protocol includes a direct device communication protocol.

In some cases, the local area wireless network communication protocol includes wireless fidelity (Wi-Fi) communication protocol and the additional communication protocol is selected from: Bluetooth (BT) communication protocol, and Airplay communication protocol.

In certain aspects, the controller is further configured, in response to failing to detect a previously configured Wi-Fi connection, to: cause the communications module to communicate via at least one of the additional communication protocols; and disable the active listening mode.

In some implementations, the speaker further includes a user interface having a set of user interface buttons including at least one of: a pairing button for controlling an additional communication protocol connection, a virtual personal assistant (VPA) button for controlling the active listening mode, or a microphone control button for at least one of enabling or disabling the set of microphones.

In particular cases, prior to establishing any Wi-Fi connection, the speaker is configured to operate in only two modes based upon the power up command and the power down command, respectively, and after establishing a Wi-Fi connection, the speaker is configured to operate in at least one additional mode including the standby mode based upon the power up command or the power down command.

In certain aspects, the speaker further includes: an application processor (AP) coupled with the controller; and a low power microcontroller (LPM) coupled with the AP and the controller, where in response to detecting that the speaker is disconnected from a power source, the controller is configured to adjust between two or more of the following power states: an active state whereby audio output is provided at the transducers and the set of microphones remain in the active listening mode; an idle state whereby audio output is not provided at the transducers and the set of microphones remain in the active listening mode; a parking state whereby audio output is not provided at the transducers and the set of microphones are in the standby mode; a first sleep state whereby audio output is not provided at the transducers, the AP is suspended and the set of microphones are disabled; and a second sleep state whereby audio output is not provided at the transducers, the AP is powered off, and the set of microphones are disabled.

In some aspects, in response to the power up command, a transition from the first sleep state to the idle state requires approximately 5 seconds to approximately 10 seconds and a transition from the second sleep state to the idle state requires approximately 10 seconds to approximately 20 seconds, and the speaker can operate for up to approximately the following periods without requiring additional power for each of the power states: 9-15 hours in the active state; 25-35 hours in the idle state; 25-35 days in the first sleep state; and 35-45 days in the second sleep state.

In certain cases, the speaker further includes a digital signal processor (DSP) coupled with the controller, where the DSP is configured to process user voice commands for distinct virtual personal assistant (VPA) platforms at approximately the same speed.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

It is noted that the drawings of the various implementations are not necessarily to scale. The drawings are intended to depict only typical aspects of the disclosure, and therefore should not be considered as limiting the scope of the invention. In the drawings, like numbering represents like elements between the drawings.

DETAILED DESCRIPTION

As noted herein, various aspects of the disclosure generally relate to speaker systems and related control methods. More particularly, aspects of the disclosure relate to controlling power usage in smart speakers, such as portable smart speakers.

Commonly labeled components in the FIGURES are considered to be substantially equivalent components for the purposes of illustration, and redundant discussion of those components is omitted for clarity.

Aspects and implementations disclosed herein may be applicable to a wide variety of speaker systems. In some implementations, a portable speaker system such as a smart speaker or hand-held speaker system is disclosed. Certain examples of speaker systems are described as "portable" speaker systems, which is to say, these speaker systems have a power storage device (e.g., a battery) as well as connection for an external power source (e.g., a connection with an external power source such as an alternating current (AC) source). That is, the portable smart speaker includes a hard-wired power connection, and can also function using stored (e.g., battery) power. Additionally, the portable smart speaker has local network connectivity (e.g., to a wireless fidelity, or Wi-Fi network), as well as direct device connectivity (e.g., via Bluetooth (BT) communication protocol, or Airplay communication protocol). It should be noted that although specific implementations of speaker systems primarily serving the purpose of acoustically outputting audio are presented with some degree of detail, such presentations of specific implementations are intended to facilitate understanding through provision of examples and should not be taken as limiting either the scope of disclosure or the scope of claim coverage.

In various cases described herein, the speaker system includes a set of microphones that includes at least one far field microphone. In various particular implementations, the speaker system includes a set of microphones that includes a plurality of far field microphones. The far field microphones can enable virtual personal assistant (VPA) functionality, e.g., using any of a number of commercially available VPA systems. In various particular implementations, the microphones are controllable to switch between different modes for conserving power.

Various particular implementations include speaker systems and related computer-implemented methods of controlling power usage across a plurality of operating states (or, operating modes). In various implementations, a portable smart speaker system (including at least one far field microphone) is configured to switch the set of microphones to different modes in order to conserve power. For example, in some cases, the speaker is configured to switch microphones from an active listening mode to a standby mode in response to detecting a power down command. This "parking period" allows the speaker system to switch the microphones back to the active listening mode without a wake delay, e.g., in real time in response to a suitable action such as power up command or connecting to a paired device. After the parking period expires without detecting a suitable action (e.g., connection of a paired device or power up command), the speaker system switches from standby mode to a first sleep mode. In order to exit the first sleep mode, the speaker system must receive a power up command and go through a wake delay prior to resuming active listening mode with the microphones. The speaker system is also configured to adjust between a plurality of power states (or, modes) for managing power usage. In various implementations, the speaker system is configured to transition between power states in a matter of seconds. Additionally, in particular power states, the speaker system is configured to run on stored (e.g., battery) power for a manner of weeks (e.g., up to several weeks). In these cases, the speaker system enables complete functionality (e.g., voice pickup, VPA, etc.) on a battery charge for significantly longer than conventional portable smart speakers. That is, the speaker system is configured to actively manage power usage in order to extend its useful life without requiring recharge.

This enables dynamic audio and interface experiences for users that is not available in conventional systems.

Figure 1:
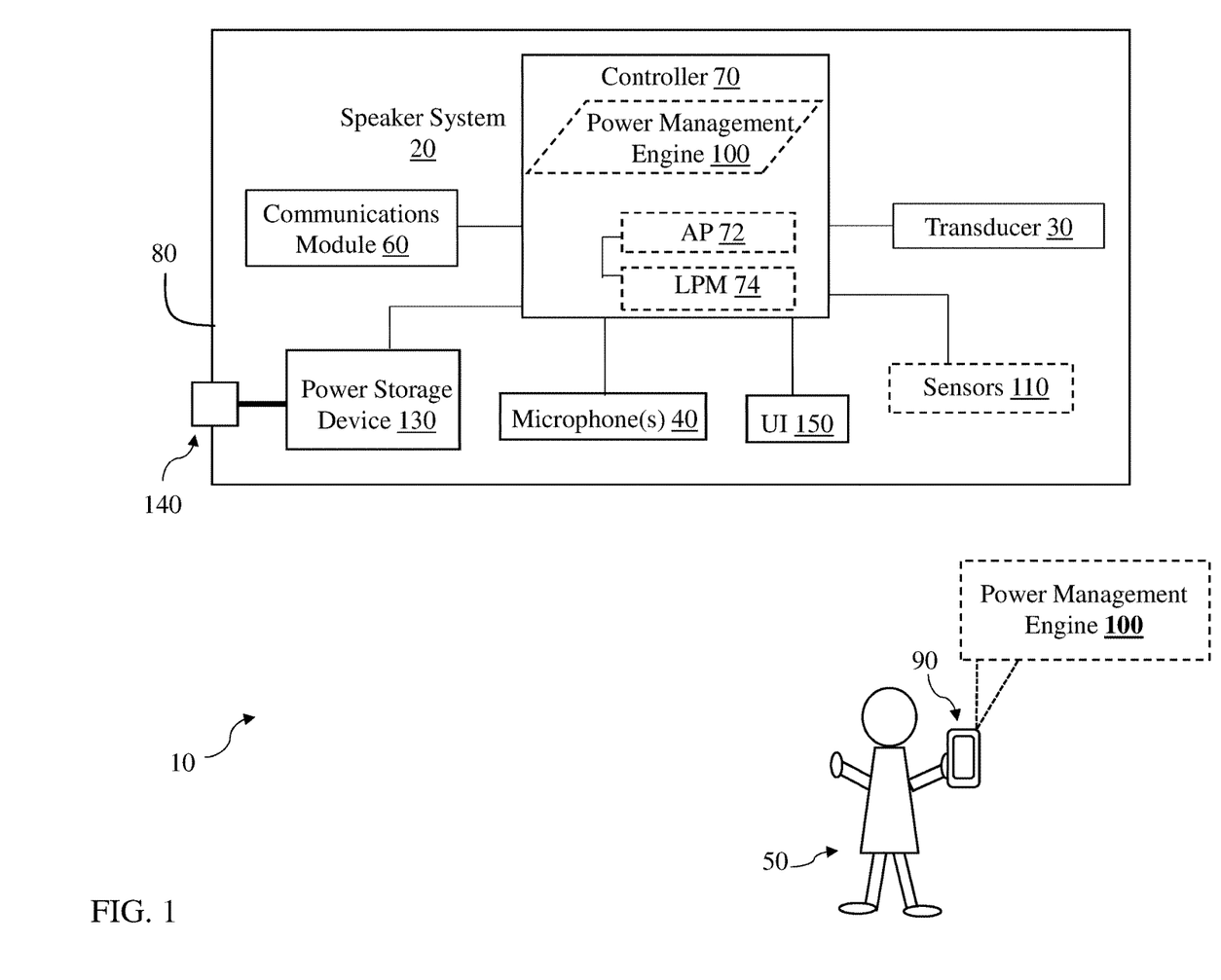
FIG. 1 is a schematic depiction of an environment illustrating a smart speaker according to various implementations.

FIG. 1 shows an illustrative physical environment 10 including a speaker system (e.g., a portable smart speaker system) 20 according to various implementations. As shown, the speaker system 20 can include an acoustic transducer 30 for providing an acoustic output to the environment 10. It is understood that the transducer 30 can include one or more conventional transducers, such as a low frequency (LF) driver (or, woofer) and/or a high frequency (HF) driver (or, tweeter) for audio playback to the environment 10. The speaker system 20 can also include a set of microphones 40. In some implementations, the microphone(s) 40 includes a microphone array including a plurality of microphones. The microphone(s) 40 include at least one far field microphone. In particular cases, the far field microphone(s) are configured to detect and process acoustic signals, in particular, human voice signals, at a distance of at least one meter (or one to two wavelengths) from a user. The microphones 40 are configured to receive acoustic signals from the environment 10, such as voice signals from one or more users (one example user 50 shown). The microphone(s) 40 can also be configured to detect ambient acoustic signals within a detectable range of the speaker system 20.

The speaker system 20 can further include a communications module 60 for communicating with one or more other devices in the environment 10 and/or in a network (e.g., a wireless network). In some cases, the communications module 60 can include a wireless transceiver for communicating with other devices in the environment 10. In other cases, the communications module 60 can communicate with other devices using any conventional hard-wired connection and/or additional communications protocols. In some cases, communications protocol(s) can include local area wireless network communication protocol (e.g., a wireless fidelity (Wi-Fi) protocol using a wireless local area network (WLAN)), a communication protocol such as IEEE 802.11b/g or 802.11ac, a cellular network-based protocol (e.g., third, fourth or fifth generation (3G, 4G, 5G cellular networks) or one of a plurality of internet-of-things (IoT) protocols, such as: Bluetooth, BLE Bluetooth, ZigBee (mesh LAN), Airplay (and variations), Chromecast (and variations), Z-wave (sub-GHz mesh network), 6LoWPAN (a lightweight IP protocol), LTE protocols, RFID, ultrasonic audio protocols, etc. In additional cases, the communications module 60 can enable the speaker system 20 to communicate with a remote server, such as a cloud-based server running an application for managing a virtual personal assistant (VPA) or power usage. In various particular implementations, separately housed components in speaker system 20 are configured to communicate using one or more conventional wireless transceivers. In certain implementations, as noted herein, the communications module 60 is configured to communicate with other devices and/or a network over both a local area wireless network communication protocol (e.g., Wi-Fi communication protocol) and at least one additional communication protocol (e.g., a direct device communication protocol). The additional communication protocol can include, e.g., Bluetooth or Airplay.

The speaker system 20 can further include a controller 70 coupled with the transducer 30, the microphone(s) 40 and the communications module 60. As described herein, the controller 70 can be programmed to control one or more power conservation functions. The controller 70 can include conventional hardware and/or software components for executing program instructions or code according to processes described herein. For example, controller 70 can include one or more processors, memory, communications pathways between components, and/or one or more logic engines for executing program code. In certain examples, the controller 70 includes a microcontroller or processor having a digital signal processor (DSP), such that acoustic signals from the microphone(s) 40, including the far field microphone(s), are converted to digital format by analog to digital converters. In particular implementations, the controller 70 includes, or is otherwise coupled with, an application processor (AP) 72 and a low power microprocessor (LPM) 74. As described herein, the controller 70 is configured to adjust between two or more power states by enabling/disabling functions in the AP 72 and LPM 74. The AP 72 and LPM 74 are additionally connected, for example, enabling the LPM 74 to control functions of the AP 72.

Controller 70 can be coupled with the transducer 30, microphone 40 and/or communications module 60 via any conventional wireless and/or hardwired connection which allows controller 70 to send/receive signals to/from those components and control operation thereof. In various implementations, controller 70, transducer 30, microphone 40 and communications module 60 are collectively housed in a speaker housing 80.

For example, in some implementations, functions of the controller 70 can be managed using a smart device 90 that is connected with the speaker system 20 (e.g., via any wireless or hard-wired communications mechanism described herein, including but not limited to Internet-of-Things (IoT) devices and connections). In some cases, the smart device 90 can include hardware and/or software for executing functions of the controller 70 to manage power usage in the speaker system 20. In particular cases, the smart device 90 includes a smart phone, tablet computer, smart glasses, smart watch or other wearable smart device, portable computing device, etc. The smart device 90 can have an audio gateway, processing components, and one or more wireless transceivers for communicating with other devices in the environment 10. For example, the wireless transceiver(s) can be used to communicate with the speaker system 20, as well as one or more connected smart devices within communications range. The wireless transceivers can also be used to communicate with a server hosting a mobile application that is running on the smart device 90, for example, a power management engine 100.

The server can include a cloud-based server, a local server or any combination of local and distributed computing components capable of executing functions described herein. In various particular implementations, the server is a cloud-based server configured to host the power management engine 100, e.g., running on the smart device 90. According to some implementations, the power management engine 100 can be downloaded to the user's smart device 90 in order to enable functions described herein.

In various implementations, sensors 110 located at the speaker system 20 and/or the smart device 90 can gather data about the environment 10 proximate to the speaker system 20. For example, the sensors 110 can include a vision system (e.g., an optical tracking system or a camera) for obtaining data to identify the user 50 or another user in the environment 10. The vision system can also be used to detect motion proximate the speaker system 20. In other cases, the microphone 40 (which may be included in the sensors 110) can detect ambient noise proximate the speaker system 20 (e.g., an ambient SPL), in the form of acoustic signals. The microphone 40 can also detect acoustic signals indicating voice commands from the user 50. In some cases, one or more processing components (e.g., central processing unit(s), digital signal processor(s), etc.), at the speaker system 20 and/or smart device 90 can process data from the sensors 110 to provide indicators of user characteristics and/or environmental characteristics to the power management engine 100. Additionally, in various implementations, the power management engine 100 includes logic for processing data about one or more signals from the sensors 110, as well as user inputs to the speaker system 20 and/or smart device 90.

The speaker system 20 also includes a power storage device 130 coupled with a power connector 140. The power storage device 130 includes, for example, an on-board battery enabling usage of the speaker system 20 while the power connector 140 is not connected with an external power source (e.g., an alternating current (AC) source such as a conventional power outlet). The battery can include any number of rechargeable or single-use batteries commonly used in portable electronic devices.

Figure 2:
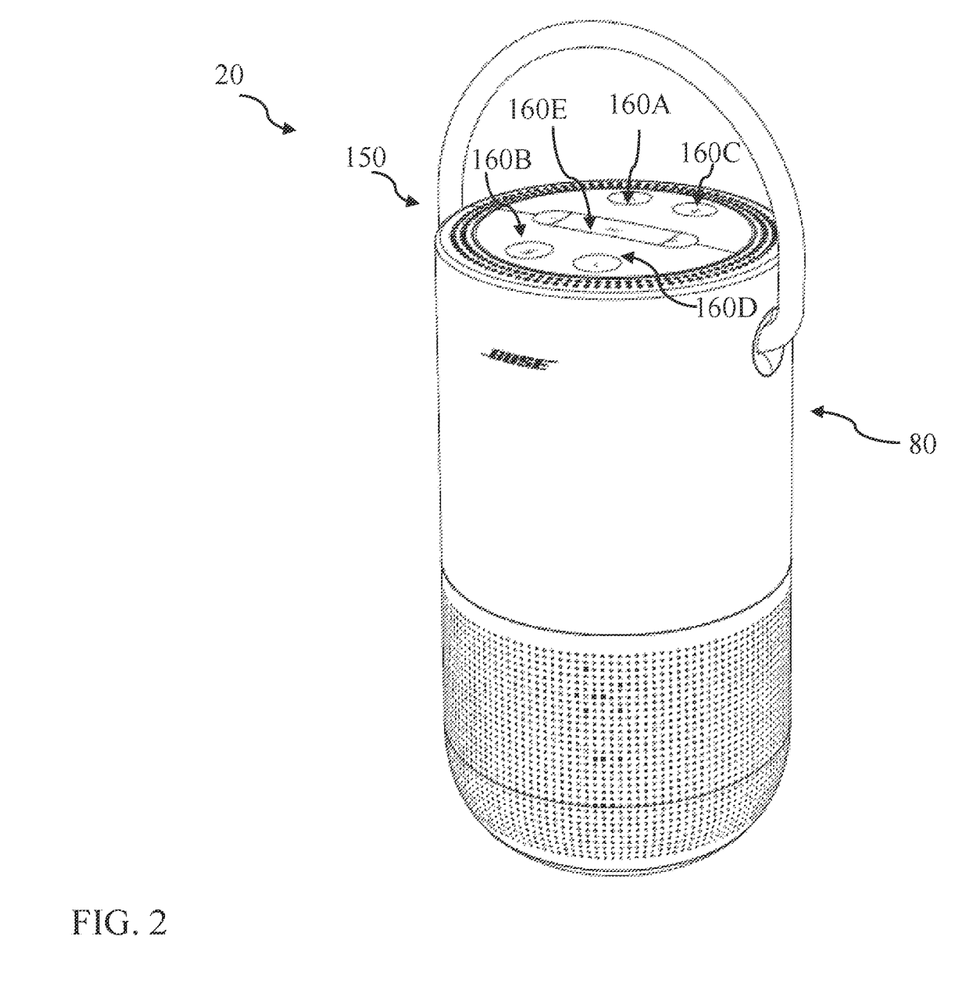
FIG. 2 is a schematic perspective view of the speaker system of FIG. 1 according to various implementations.

In some cases, as shown in FIG. 2, the speaker system 20 includes a user interface (UI) 150 including a set of user interface buttons 160 enabling simplified control of functions at the speaker system 20. In particular cases, the interface buttons 160 include a power button 160A for powering the speaker system 20 on/off. In additional cases, the interface buttons 160 also include and at least one of: a pairing button 160B for controlling an additional communication protocol connection (e.g., BT, or Airplay), a virtual personal assistant (VPA) button 160C for controlling the active listening mode, a microphone control button 160D for enabling and/or disabling the microphones 40, or a multi-function button (MFB) 160E that enables playback control (e.g., play/pause of playback with a tap, skipping playback tracks with a double-press, rebooting with a press-and-hold, etc.). It is understood that a similar or distinct user interface 150 (not shown) can also be presented on the smart device 90, e.g., via the power management engine 100. This user interface 150 can provide the same functions (e.g., buttons 160), or additional functions as those illustrated in the physical user interface in FIG. 2.

Returning to FIG. 1, the power management engine 100 manages device functions and connections in order to conserve power and extend the useful life of the speaker system 20. In particular example cases, in its first usage (e.g., "out of the box") scenario, the speaker system 20 is configured to operate in only two modes: ON and OFF, based upon a power up command and a power down command, respectively. In certain cases, prior to establishing any local network (e.g., Wi-Fi) connection, the speaker system 20 is configured to operate in only two modes based upon a power up command and power down command (e.g., at power button 160A, or via a control interface running on the power management engine 100). That is, the controller 70 is configured to operate the speaker system 20 in only an ON mode or an OFF mode, based upon a power up command (e.g., to turn from OFF to ON) or a power down command (e.g., to turn from ON to OFF). Further, prior to establishing the initial local area (e.g., Wi-Fi) connection, the power button 160A (or similar power on/off command at the smart device 90) has only two functions: ON command and OFF command. In these example implementations, as described herein, after establishing the initial local area (e.g., Wi-Fi) connection, the power management engine 100 is configured to detect additional functions of the power button 160A, e.g., a short power down command such as a short press and an extended power down command such as a press-and-hold command. In these cases, after establishing a Wi-Fi connection, the speaker system 20 is configured to operate in at least one additional state based upon the power up command or the power down command, for example, a parking state (or, standby mode). As described herein, the parking state can conserve power for the power storage device 130, and extend the useful life of the speaker system 20 when compared with conventional speaker systems that do not function in a parking state.

In particular cases, the far-field microphone(s) in the set of microphones 40 (FIG. 1) is configured to pick up audio from locations that are approximately two (2) wavelengths away from the source (e.g., the user 50). For example, the far-field microphone(s) can be configured to pick up audio from locations that are at least one, two or three meters (or, a few feet up to several feet or more) away. In various implementations, the controller 70 includes or is coupled with at least one digital signal processor (DSP) configured to use automatic echo cancellation (AEC) and/or beamforming in order to process the far field microphone signals. In particular implementations, the DSP is configured to process user voice commands for distinct VPA platforms (e.g., Alexa, Ski, Google) at approximately the same speed. That is, the speaker system 20 processes voice commands from the user 50 to any number of VPA platforms with approximately the same delay between receiving the user voice signals and initiating playback of the VPA response. This enables the user 50 to interact with any of a number of VPA platforms with approximately the same delay between making a voice command and hearing response playback.

As noted herein, the power management engine 100 is configured to manage power usage by the speaker system 20, e.g., by limiting power consumption by the power storage device 130 based upon one or more device functions and speaker configurations. Particular processes performed by the power management engine 100 (and the logic therein) are further described with reference to the device state diagram 300 in FIG. 3 and the process flow diagram 400 in FIG. 4.

Figure 3:
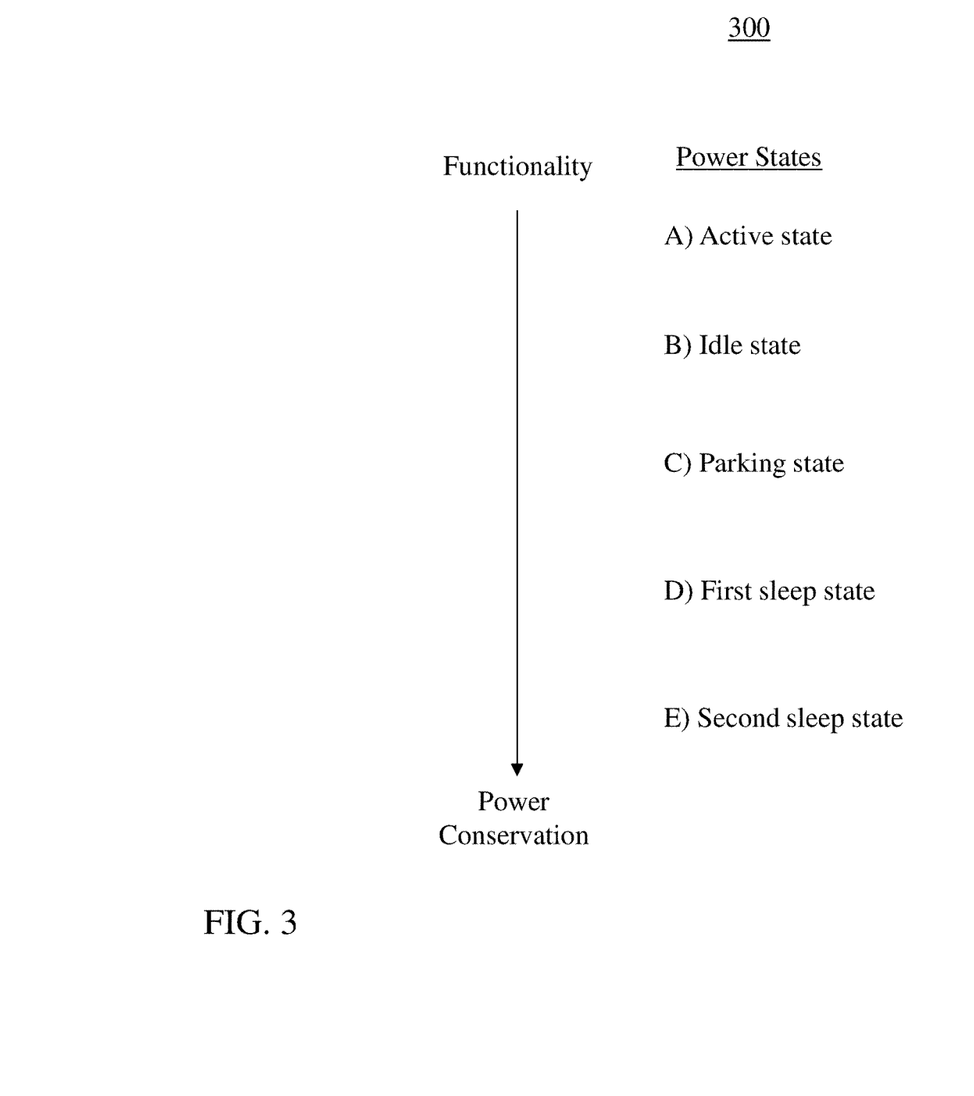
FIG. 3 is a state diagram illustrating various power states for a speaker system according to various implementations.

In various implementations, the speaker system 20 is configured to operate in a plurality of power states, examples of which are illustrated in the state diagram 300 in FIG. 3. In various implementations, the example power states illustrated in state diagram 300 are entered in response to detecting that the speaker system 20 is disconnected from an external power source (via connector 140), i.e., that the speaker system 20 is running on the power storage device 130. In these cases, the power management engine 100 is configured to adjust between two or more of the power states, including for example:

A) An active state, where audio output is provided at the transducers 30 and the microphones 40 (FIG. 1) remain in the active listening mode. In this state, the speaker system 20 is outputting audio playback (e.g., music, a podcast, news etc.) at the transducers 30, and the microphones 40 are in active listening mode, e.g., to aid in voice command device functions such as VPA functions. The active state enables connectivity with applications (e.g., external software applications) via one or more communications protocols, or applications running on a connected device such as the smart device 90. Of the power states shown in power state diagram 400, the active state consumes the greatest amount of power (e.g., in Watts) and depletes the power storage device 130 in the shortest period. In various implementations, the speaker system 20 can operate for up to approximately 9-15 hours in the active state without requiring additional power, e.g., without recharging the power storage device 130 or connecting to an external power source via the connector 140.

B) An idle state, where, audio output is not provided at the transducers 30 and the microphones 40 remain in the active listening mode. In this state, the speaker system 20 is not outputting audio playback, but the microphones 40 remain in active listening mode to aid in voice command functions such as VPA functions. The idle state enables connectivity with applications (e.g., external software applications) via one or more communications protocols, or applications running on a connected device such as the smart device 90. The idle state consumes less power and depletes the power storage device 130 over a longer period than the active state. In various implementations, the speaker system 20 can operate for up to approximately 23-35 hours in the idle state without requiring additional power, e.g., without recharging the power storage device 130 or connecting to an external power source via the connector 140.

C) A parking state, where audio output is not provided at the transducers 30, and the microphones 40 are in a standby mode. As noted herein, the parking state conserves power relative to the idle state, and enables the microphones 40 to be reactivated into active listening mode quickly (e.g., without a wake delay) in order to enable, for example, VPA functions. In other words, the parking state enables the microphones 40 to be reactivated into active listening mode after a first time period, e.g., in real time or in a matter of a couple of seconds. The parking state does not enable connectivity with applications (e.g., external software applications). The parking state consumes less power and depletes the power storage device 130 over a longer period than the idle state.

D) A first sleep state, where the transducers 30 do not provide audio output, and the microphones 40 are disabled. In this state, the application processor (AP) 72 is suspended, conserving even more power than the idle state (where the AP remains active). Once the speaker system 20 enters the first sleep state, reactivating the microphones 30 requires a wake delay, e.g., a delay of a second time period that is greater than the first time period. The first sleep state does not enable connectivity with applications (e.g., external software applications). The first sleep state consumes less power and depletes the power storage device 130 over a longer period than the parking state. In various implementations, the speaker system 20 can operate for up to approximately 25-35 days in the first sleep state without requiring additional power, e.g., without recharging the power storage device 130 or connecting to an external power source via the connector 140.

E) A second (e.g., deeper) sleep state, where the transducers 30 do not provide audio output, the microphones 40 are disabled, and the AP 72 is powered off. In this state, the AP 72 is completely powered off, requiring a cold restart to become active again. The second sleep state does not enable connectivity with applications (e.g., external software applications). The second sleep state consumes less power and depletes the power storage device 130 over a longer period than the first sleep state. In various implementations, the speaker system 20 can operate for up to approximately 35-45 days in the second sleep state without requiring additional power, e.g., without recharging the power storage device 130 or connecting to an external power source via the connector 140.

Turning to flow diagram 400 (FIG. 4), processes 410-480 are illustrated as occurring after the speaker system 20 has been powered ON. In some cases, processes are described as occurring while the speaker system 20 is operating in an active listening mode, but is disconnected from an external power source (e.g., running on power storage device 130).

Figure 4:
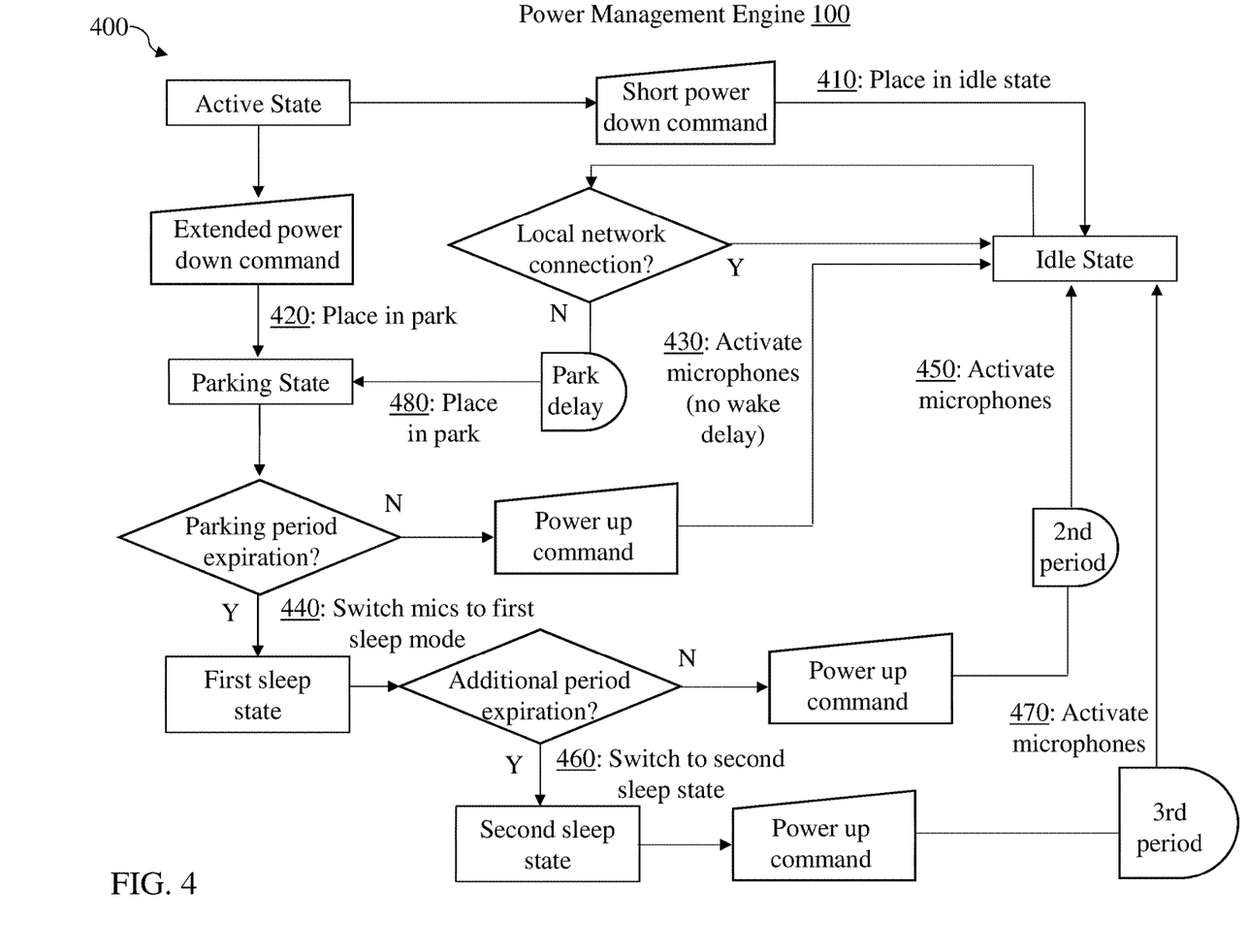
FIG. 4 is a flow diagram illustrating processes in managing power at a speaker system according to various implementations.

That is, while in the active listening mode, the microphones 40 are configured to detect a wake up word (WUW) for triggering input of a user voice command to a virtual personal assistant (VPA). In these cases, the speaker system 20 is configured to respond to a voice command from the user 50, for example, including a WUW (e.g., "Hey Bose") and a command following the WUW (e.g., " . . . please play music by Artist X") with negligible delay (e.g., within one or two seconds). It is understood that in various implementations, the controller 70 is configured to maintain the microphones 40 in active listening mode while the speaker system 20 is connected with the external power source, and manage different operating modes and power states as described herein when the speaker system 20 is disconnected from the external power source.

As shown in a preliminary process 410, and while the speaker system 20 is in the active state (FIG. 3), in response to detecting a short power down command, the power management engine 100 is configured to place the speaker system 20 into the idle state. That is, in response to detecting this short power down command, the power management engine 100 is configured to stop the audio playback at the transducers 30 (occurring while the speaker system 20 is in the active state), and switch to the idle state. In various implementations, the short power down command includes a tap or short push (e.g., one second push or less) of the power button 160A, a voice command (e.g., "Hey Bose, please power down") or a gesture-based command (e.g., turning the speaker system 20 upside down or otherwise reorienting the speaker system 20, or a double-tap gesture at an interface on the speaker system 20 or the smart device 90). In any case, in response to the short power down command, the power management engine 100 is configured to switch the speaker system 20 from the active state to the idle state.

As shown in process 420, in response to detecting a power down command, the power management engine 100 is configured to place the speaker system 20 into the parking state for a parking period. In various implementations, the power down command includes an extended power down command, such as a press and hold gesture detected at the power button 160A (FIG. 2), or a gesture-based press-and-hold, tap-and-hold (e.g., on capacitive touch interface) or multi-modal gesture detected at the smart device 90. In some cases, this power down command is called a "long press" power command. In additional cases, the power down command includes a voice command received at another speaker that is connected (or, grouped) with the speaker system 20, or at a smart device 90 connected with the speaker system 20. In these cases, in response to the power down command, the power management engine 100 switches the microphones 40 from active listening mode to a standby mode for the parking period. In parking mode, the power management engine 100 disconnects the communications module 60 from external applications, for example, external software applications running through the speaker system 20 such as a VPA platform. These implementations allow the user 50 to quickly re-engage with the speaker system 20 if, for example, the user 50 changes his/her mind about powering down the speaker system 20. In certain cases, the parking period is approximately 5 minutes to approximately 10 minutes long.

The microphones 40 remain in standby mode while the speaker system 20 is in the parking state, such that the microphones 40 will not process a user voice command in this state. In this case, the microphones 40 remain active, but the power management engine 100 is not configured to process voice commands that are detectable by the microphones 40 in the standby mode. However, the power management engine 100 is configured to transition the speaker system 20 back into the idle or active state (e.g., by placing the microphones 40 back into active listening mode, such as to process a VPA command) in response to detecting a suitable action. In some cases, the suitable action includes detecting a power up command during the parking period (process 430, FIG. 4). That is, the user 50 can switch the microphones 40 from standby mode to active listening mode by executing a power up command during the parking period. In various implementations, the power up command is received at a button 160 on the interface 150, via a power control command received at the power management engine 100 running on the smart device 90 (e.g., via a user interface command), or via a voice command detected at another speaker or device (e.g., smart device 90) connected with the speaker system 20. In these cases, when the power up command is received during the parking period, the power management engine 100 switches the microphones 40 from standby mode to active listening mode after a first time period (e.g., without a wake delay). That is, because the microphones 40 remain in standby mode during the parking period, those microphones 40 can be switched back to active listening mode with a delay of several seconds or less (e.g., zero seconds up to several seconds).

In still other implementations, the power management engine 100 is configured to transition the speaker system 20 from the parking state to the idle or active state in response to detecting other suitable action(s). For example, the power management engine 100 transitions the speaker system 20 from the parking state to the idle or active state in response to detecting actuation of a hardware button at the speaker system 20 during the parking state, or in response to detecting that the speaker system 20 is connected with a paired device while in the parking state. In certain cases, the power management engine 100 transitions the speaker system 20 from the parking state to the idle or active state in response to any detected actuation of a hardware button at the speaker system 20. In other cases, the power management engine 100 detects a change in device connection (e.g., detecting a connection between the smart device 90 and the communications module 60 that was not already established) during the parking period, and switches the speaker system 20 from the parking state to the idle or active state (e.g., switches the microphones 40 from standby mode to active listing mode) after the first time period (e.g., without a wake delay). In certain implementations, only one suitable action is necessary to place the microphones 40 back into active listening mode from the parking state, e.g., only a power up command or a paired device connection is needed to trigger this device change.

While the transition from parking state to idle or active state is described with reference to functionality of the microphones 40, it is understood that one or more functions of the speaker system 20 can be adjusted in response to one of the suitable actions described herein. In certain cases, the transition from the parking state to the idle or active state includes adjusting functionality at the speaker system 20 in addition to, or in place of functionality of the microphones 40, e.g., connection state and/or strength of one or more wireless modules (in communications modules 60), power strength and/or state of one or more processors, and/or display or light brightness or display state at the UI 150 (e.g., lighting accent such as a light ring around the buttons 160).

In some cases, the microphones 40 are switched back to active listening mode from standby mode in less than 5 seconds, and in particular cases, in less than 2 or 3 seconds. In various additional implementations, the power management engine 100 switches the microphones 40 into active listening mode (when not already in active listening mode) in response to connection of the speaker system 20 to external power (e.g., via power connector 140).

After expiration of the parking period without detecting a power up command, the power management engine 100 is configured, in process 440, to switch the set of microphones 40 from standby mode to a first sleep mode (in the first sleep state, FIG. 3). As noted herein, in the first sleep state, the AP 72 is suspended. Suspending the AP 72 can deactivate several functions, e.g., communications/networking functions, audio playback functions, voice detection functions, etc. In this suspended state, the AP 72 maintains other functions, e.g., management of the power storage device 130. In the first sleep state, the power management engine 100 requires a power up command (e.g., a short power up command or an extended power up command) and a wake delay (e.g., delay of a second period, greater than the first period) to resume active listening mode at the microphones 40 (in idle state), shown as process 450 in FIG. 4. That is, due to suspension of the AP 72, the microphones 40 (and associated voice command detection, such as VPA functionality) cannot resume listening mode without a wake delay. In various implementations, the second period (also referred to as the wake delay) is at most approximately 5 seconds to approximately 15 seconds, and in particular cases, is at most approximately 5 seconds to approximately 10 seconds.

Following the parking period while the speaker system 20 is disconnected from external power, and after expiration of an additional period (following the parking period) without detecting a user voice command or a power up command, the power management engine 100 is configured to switch the speaker system 20 from the first sleep state to the second sleep state that requires less power than the first sleep state (process 460, FIG. 4). In various implementations, this additional period (following the parking period) is at most approximately 12 hours to approximately 24 hours. However, in other implementations, this additional period is at most approximately 24 hours to approximately 36 hours. In particular cases, the additional period varies based upon the remaining storage level in the power storage device 130. For example, the power management engine 100 is configured to detect a remaining storage level (e.g., battery level) in the power storage device 130 while in the first sleep state, and in response to detecting that the remaining storage level is below a threshold level while the speaker system 20 is in the first sleep state, reduces the additional period before switching to the second sleep state. In particular cases, the additional period is approximately 24-36 hours when the remaining storage level is above the threshold, and is approximately 12-24 hours when the remaining storage level is below the threshold. In certain implementations, the threshold is set to approximately 20 percent of the capacity of the power storage device 130, e.g., when the battery has only 20 percent of its remaining life.

Once the speaker system 20 is in the second sleep state, the power management engine 100 requires an extended wake delay that lasts a third time period in order to switch the microphones 40 back into active listening mode (process 470, FIG. 4). The extended wake delay is longer than the wake delay required to switch the microphones to active listening mode from the first sleep state. That is, in various implementations, the third time period is greater than the second time period. In various implementations, the third time period (or, extended wake delay) is at least approximately 10 seconds or at least approximately 15 seconds, and in some cases, is approximately 20 seconds or more.

As noted herein, transitions between differing power states can require differing transitional time periods. While these transitional time periods are sometimes referred to as wake delays, in certain implementations, these time periods can be equal to approximately zero seconds, or in other words, nearly instantaneous. In certain aspects, the first time period is approximately zero seconds to approximately several seconds. In particular implementations, as noted herein, the second time period is greater than the first time period. In additional cases, the third time period is greater than the second time period. In still further implementations, the second time period is greater than the first time period and lesser than the third time period.

Additional implementations of the speaker system 20 can enable distinct, potentially faster transitions between operating states, e.g., between the first sleep state and the idle or active state. For example, in particular implementations, the speaker system 20 includes an additional microphone (not shown) that is separate from microphones 40 and is configured to detect an ambient noise level indicative of user activity, e.g., noise with a signature indicating nearby user activity such as the closing or opening of a door, running of water, footsteps, etc. In these cases, the additional microphone remains active during the first sleep state, and the LPM 74 is configured, along with the additional microphone, to read and detect the ambient acoustic signature and selectively wake the AP 72 for enabling idle or active state functions, e.g., in response to detecting ambient acoustic signals indicative of user activity.

The power management engine 100 is also configured to operate in distinct modes, for example, to conserve power when running on the power storage device 130. In some cases, these modes can be beneficial when traveling with the speaker system 20 or operating the speaker system away from known network connections (e.g., while in transit between locations, in remote locations or in unfamiliar locations). In various implementations, the power management engine 100 is configured, in response to failing to detect a previously configured wireless network connection (e.g., Wi-Fi network connection), to: i) cause the communications module 60 to communicate over one of the additional communication protocols (e.g., Bluetooth, Airplay, etc.); and ii) disable the active listening mode for the microphones 40. That is, the power management engine 100 is configured to detect when the speaker system 20 is located in a remote or otherwise unfamiliar (or yet-to-be configured) location, and conserve power by disabling active listening mode for the microphones 40.

In still further implementations, the power management engine 100 is configured to periodically (or, continuously) monitor network and other connections for the speaker system 20, and adjust power states accordingly. For example, while operating in the idle state, the power management engine 100 is configured to periodically or continuously detect whether the communications module 60 is connected with a local network (e.g., a Wi-Fi network). In these cases, in response to detecting that the communications module 60 is not connected with a local network, the power management engine 100 places the speaker system 20 in the parking state (process 480, FIG. 4). In certain example implementations, the power management engine 100 is only configured to support voice commands issued over a local network, e.g., due to VPA technical specifications. In these cases, switching the microphones 40 to the parking state can aid in reducing unnecessary power usage for detecting voice commands that are not supported by the VPA. In various implementations, as shown in FIG. 4, the power management engine 100 institutes a park delay before switching from the idle state to the parking state. In some cases, the park delay is equal to approximately 15-20 minutes.

As noted herein, the power management engine 100 is configured to conserve power usage at the speaker system 20, extending its useful life when not connected with an external power source. Additionally, the power management engine 100 is configured to maintain the speaker system 20 in a parking (or standby, or ready) state for a period before switching to one or more low power (or, sleep) states. When compared with conventional speaker systems, the flexible, responsive configuration of the power management engine 100 enhances the user experience and extends the useful life of the system 20 between charges. In various implementations, the power management engine 100 has the technical effect of extending the operating time and/or useful life of the speaker system when running on reserve power.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

We claim:

1. A speaker, comprising:
an acoustic transducer for providing an audio output;
a set of microphones for detecting a user voice command; and
a controller coupled with the acoustic transducer and the set of microphones, wherein the controller is configured to:
in response to detecting a power down command, switch the set of microphones from an active listening mode to a standby mode for a parking period,
in response to detecting a power up command during the parking period, switch the set of microphones from the standby mode to the active listening mode after a first time period, and
in response to detecting the power up command after expiration of the parking period, switch the set of microphones from the standby mode to the active listening mode after a second time period that is greater than the first time period.

2. The speaker of claim 1, wherein the controller is configured to maintain the set of microphones in the active listening mode in response to detecting that the portable smart speaker maintains a connection to a power source that is external to the speaker.

3. The speaker of claim 2, wherein while the speaker is disconnected from the power source external to the speaker, the controller is further configured, after expiration of an additional period without detecting the power up command after expiration of the parking period, to switch the speaker from a first sleep mode to a second sleep mode requiring less power than the first sleep mode.

4. The speaker of claim 3, wherein while in the second sleep mode, the speaker requires a delay of a third time period to switch the set of microphones to the active listening mode, wherein the third time period is greater than the second time period.

5. The speaker of claim 4, wherein the parking period is at most approximately 5 minutes to approximately 10 minutes, wherein the additional period is at most approximately 12 to approximately 24 hours, wherein the second period is at most approximately 5 seconds to approximately 15 seconds, and wherein the third period is at least approximately 15 seconds.

6. The speaker of claim 1, further comprising:
a power storage device; and
a communications module configured to communicate over both wireless fidelity (Wi-Fi) communication protocol and at least one additional communication protocol selected from: Bluetooth (BT) communication protocol, and Airplay communication protocol.

7. The speaker of claim 6, wherein the controller is further configured, in response to failing to detect a previously configured Wi-Fi connection, to:
cause the communications module to communicate via at least one of the additional communication protocols; and
disable the active listening mode.

8. The speaker of claim 6, further comprising a user interface comprising a set of user interface buttons comprising at least one of:
a pairing button for controlling an additional communication protocol connection,
a virtual personal assistant (VPA) button for controlling the active listening mode, or
a microphone control button for at least one of enabling or disabling the set of microphones.

9. The speaker of claim 6, wherein prior to establishing any Wi-Fi connection, the speaker is configured to operate in only two modes based upon the power up command and the power down command, respectively, and
after establishing a Wi-Fi connection, the speaker is configured to operate in at least one additional mode including the standby mode based upon the power up command or the power down command.

10. The speaker of claim 1, further comprising:
an application processor (AP) coupled with the controller; and
a low power microcontroller (LPM) coupled with the AP and the controller,
wherein in response to detecting that the speaker is disconnected from a power source, the controller is configured to adjust between two or more of the following power states:
an active state whereby audio output is provided at the transducer and the set of microphones remain in the active listening mode;
an idle state whereby audio output is not provided at the transducer and the set of microphones remain in the active listening mode;
a parking state whereby audio output is not provided at the transducer and the set of microphones are in the standby mode;
a first sleep state whereby audio output is not provided at the transducer, the AP is suspended and the set of microphones are disabled; and
a second sleep state whereby audio output is not provided at the transducer, the AP is powered off, and the set of microphones are disabled.

11. The speaker of claim 10, wherein in response to the power up command, a transition from the first sleep state to the idle state requires approximately 5 seconds to approximately 10 seconds and a transition from the second sleep state to the idle state requires approximately 10 seconds to approximately 20 seconds, and wherein the speaker can operate for up to approximately the following periods without requiring additional power for each of the power states:
9-15 hours in the active state;
25-35 hours in the idle state;
25-35 days in the first sleep state; and
35-45 days in the second sleep state.

12. The speaker of claim 1, further comprising a digital signal processor (DSP) coupled with the controller, wherein the DSP is configured to process user voice commands for distinct virtual personal assistant (VPA) platforms with approximately a same delay between receiving a user voice signal and initiating playback of a VPA response.

13. A non-transitory machine-readable medium comprising a computer program product, which when executed by a processor, causes the processor to control a speaker having an acoustic transducer for providing an audio output, and a set of microphones for detecting a user voice command, wherein controlling the speaker comprises:
in response to detecting a power down command for the speaker, switching the set of microphones from an active listening mode to a standby mode for a parking period, in response to detecting a power up command during the parking period, switching the set of microphones from the standby mode to the active listening mode after a first time period, and in response to detecting the power up command after expiration of the parking period, switch the set of microphones from the standby mode to the active listening mode after a second time period that is greater than the first time period.

14. The non-transitory machine-readable medium of claim 13, wherein controlling the speaker further comprises:

maintaining the set of microphones in the active listening mode in response to detecting that the portable smart speaker maintains a connection to a power source that is external to the speaker, and while the speaker is disconnected from the power source external to the speaker:

after expiration of an additional period without detecting the power up command after expiration of the parking period, switching the speaker from a first sleep mode to a second sleep mode requiring less power than the first sleep mode.

15. The non-transitory machine-readable medium of claim 14, wherein while in the second sleep mode, the speaker requires a delay of a third time period to switch the set of microphones to the active listening mode, wherein the third time period is greater than the second time period, and wherein the parking period is at most approximately 5 minutes to approximately 10 minutes, wherein the additional period is at most approximately 12 to approximately 24 hours, wherein the second time period is at most approximately 5 seconds to approximately 15 seconds, and wherein the first time period is at least approximately 15 seconds.

16. The non-transitory machine-readable medium of claim 13, wherein the speaker further comprises a power storage device, and a communications module configured to communicate over both wireless fidelity (Wi-Fi) communication protocol and at least one additional communication protocol selected from: Bluetooth (BT) communication protocol, and Airplay communication protocol, and wherein controlling the speaker further comprises:

in response to failing to detect a previously configured Wi-Fi connection:

causing the communications module to communicate via the at least one additional communication protocol; and disabling the active listening mode.

17. The non-transitory machine-readable medium of claim 16, wherein prior to establishing any Wi-Fi connection, the speaker is configured to operate in only two modes based upon the power up command and the power down command, respectively, and after establishing a Wi-Fi connection, the speaker is configured to operate in at least one additional mode including the standby mode based upon the power up command or the power down command.

18. The non-transitory machine-readable medium of claim 13, wherein the speaker further includes an application processor (AP) coupled with the controller, and a low power microcontroller (LPM) coupled with the AP and the controller, wherein in response to detecting that the speaker is disconnected from a power source, controlling the speaker includes adjusting between two or more of the following power states:

an active state whereby audio output is provided at the transducer and the set of microphones remain in the active listening mode;

an idle state whereby audio output is not provided at the transducer and the set of microphones remain in the active listening mode;

a parking state whereby audio output is not provided at the transducer and the set of microphones are in the standby mode;

a first sleep state whereby audio output is not provided at the transducer, the AP is suspended and the set of microphones are disabled; and a second sleep state whereby audio output is not provided at the transducer, the AP is powered off, and the set of microphones are disabled, wherein in response to the power up command, a transition from the first sleep state to the idle state requires approximately 5 seconds to approximately 10 seconds and a transition from the second sleep state to the idle state requires approximately 10 seconds to approximately 20 seconds, and wherein the speaker can operate for up to approximately the following periods without requiring additional power for each of the power states:

9-15 hours in the active state;
25-35 hours in the idle state;
25-35 days in the first sleep state; and
35-45 days in the second sleep state.

19. A speaker, comprising:

an acoustic transducer for providing an audio output;

a set of microphones for detecting a user voice command; and a controller coupled with the acoustic transducer and the set of microphones, wherein the controller is configured to:

in response to detecting an extended power down command, switch the set of microphones from an active listening mode to a standby mode for a parking period, in response to detecting a short power down command, switch the speaker to an idle state whereby audio output is not provided at the acoustic transducer and the set of microphones remain in the active listening mode, in response to detecting a power up command during the parking period, switch the set of microphones from the standby mode to the active listening mode after a first time period, and in response to detecting the power up command after expiration of the parking period, switch the set of microphones from the standby mode to the active listening mode after a second time period that is greater than the first time period.

20. The speaker of claim 19, further comprising:

a communications module coupled with the controller, wherein in the idle state, the controller is further configured to switch the set of microphones to the standby mode for the parking period in response to detecting that the communications module is not connected with a local network.

* * * * *